March 10, 1931.  R. TAYLOR ET AL  1,795,353
PISTON
Filed March 12, 1930
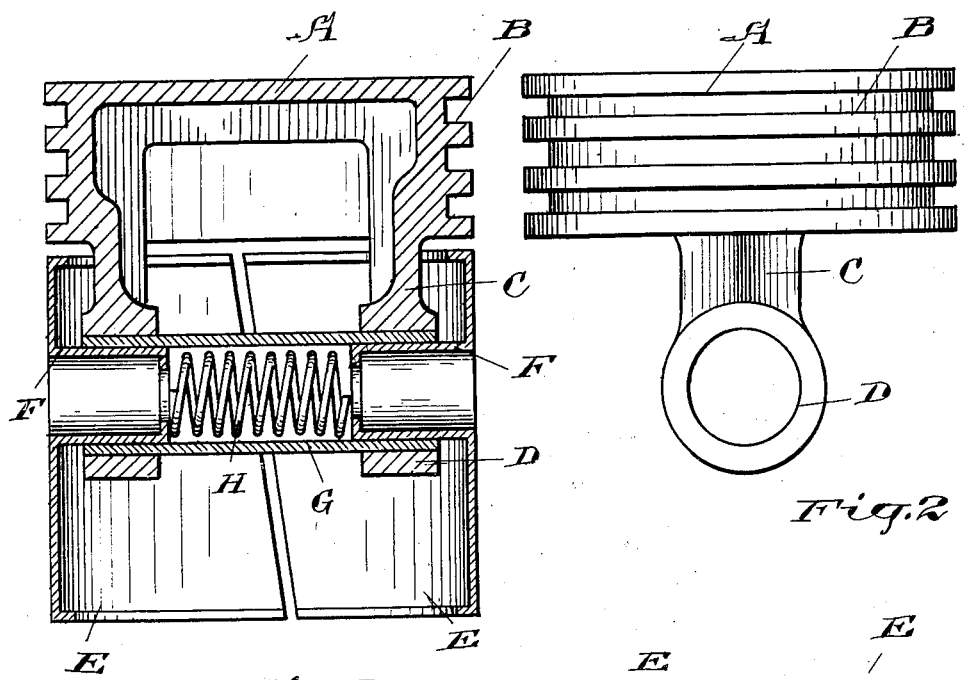
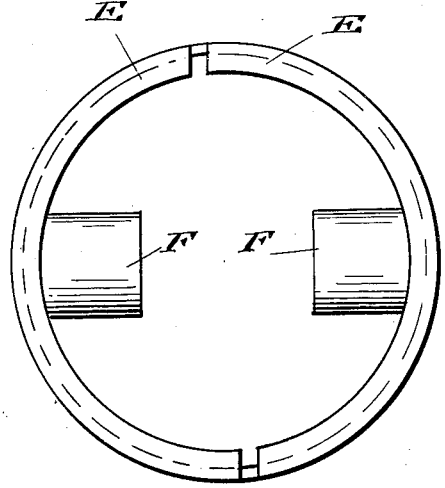
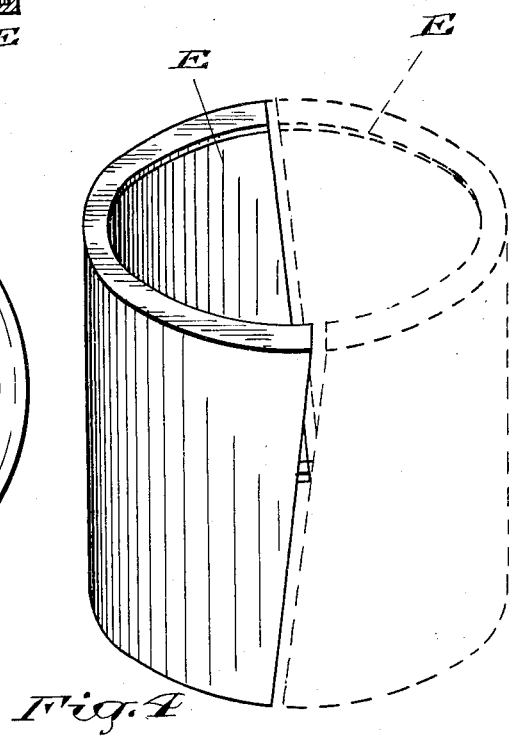
Inventors
Reginald Taylor
Henry Taylor
by Smith [signature]
their attorney Patented Mar. 10, 1931

1,795,353

UNITED STATES PATENT OFFICE

REGINALD TAYLOR AND HENRY TAYLOR, OF TORONTO, ONTARIO, CANADA

PISTON

Application filed March 12, 1930. Serial No. 435,244.

Our invention relates to a piston of the class specified, and adapted for internal combustion engines, but may be applied in combination with air compressors and the like, the aim and object being to devise a piston that will continually maintain a true and close contact with the cylinder walls, regardless of wear, expansion, or contraction of the interior dimensions of the cylinder bores.

The invention embodies in construction a sleeve formed in two separate parts, and arranged as a co-operating portion of the piston, and being adapted to automatically adjust inwardly and outwardly in radial relation, to maintain true contact with the cylinder walls, and thereby eliminate piston slap, and to equalize the wear on the cylinder walls.

The object of the invention is, firstly; to maintain a true contact of the piston with the cylinder walls, by automatic adjustment, and secondly; to render it unnecessary to regrind the bores or for the replacement of a new or larger piston where the bores have become enlarged through wear.

The piston head in which the piston rings are fitted in the usual manner, whereby a gas tight contact with the cylinder walls is maintained, also carries in combination the sleeve members. The assembly of the head and sleeve members is accomplished by a wrist pin in the nature of a short hollow tube, in which is housed a coil tension spring, the end of the spring bearing directly against the sleeve members, through which the automatic adjustments are effected.

In the accompanying drawings:

Figure 1 is an elevational sectional view through the piston;

Figure 2 is an elevational view of the piston head separated from the sleeve portions;

Figure 3 is a top plan view of the sleeve portions, and

Figure 4 is a perspective view of the sleeve portion of the piston.

Like letters of reference refer to like parts throughout the several views.

A designates the piston head which is made separate from the sleeve portion, the sleeve portion being carried by the head, in adjustable relation.

In the head is formed a series of circumferential grooves B, in which may be fitted piston rings for effecting a gas tight contact with the cylinder walls.

Integrally formed with the piston head A are depending arms C, diametrically opposed, and terminating in wrist pin bosses D.

The sleeve portion of the piston consists of two correspondingly shaped semi-cylindrical members E—E, each member being formed with an inwardly projecting hollow gudgeon or trunnion F—F, adapted to project into the ends of a hollow wrist pin, consisting of a short tubular member G, carried in diametrical relation in the wrist pin bosses D.

Housed within the wrist pin G is a coil tension spring H, against which the inserted ends of the gudgeons F—F abut, and through which an outward tension is maintained against the sleeve members, to maintain a true contact and adjustment with the cylinder walls, when the piston is assembled and positioned in the cylinder.

The line of separation between the two sleeve members is at an angle to the axial direction through the piston, and the oppositely opposed lines of cleavage are at diagonally opposed directions to one another, to prevent as far as possible the formation of a rib on the walls of the cylinder, by irregular wear opposite the interstices between the adjacent edges of the sleeve members, by the travel of the piston in the cylinder.

In assembling the head and sleeve members, the spring H is first loosely inserted into the hollow of the wrist pin G, the wrist pin is then fitted into the wrist pin bosses D, in transverse relation.

The sleeve members E—E are fitted to the wrist pin G by inserting the gudgeons into the ends of the wrist pin to abut up against the ends of the tension spring.

The parts are assembled together in true combination, the parts truely fitting together without any fastening means being introduced.

To insert the piston into the cylinder the sleeve members are pressed together, after being inserted the proper adjustment will take place, by releasing the pressure, and the lateral or radial adjustment then being effected by the tension spring, the limit of adjustment being regulated by the contact of the sleeve members against the walls of the cylinder.

What we claim as new and desire to secure by Letters Patent is:—

1. A piston of the class described comprising a head portion having depending arms formed therewith and terminating in wrist pin bosses, two correspondingly shaped semi-cylindrical sleeve members having gudgeons formed therewith and projecting inwardly therefrom, a hollow wrist pin having a coil tension spring fitted centrally therein, said wrist pin carried in transverse relation in said wrist pin bosses, the said gudgeons adapted to be inserted into the ends of the said wrist pin and engage against the ends of said spring, whereby the sleeve members are adapted for radial adjustment in cooperation with the said head.

2. A piston of the class described comprising a head portion having depending arms formed therewith, said arms terminating in wrist pin bosses, a hollow wrist pin carried in transverse relation in said bosses, a coil tension spring fitted centrally in said wrist pin, two correspondingly shaped semi-cylindrical sleeve members having inwardly projecting gudgeons formed therewith, the ends of said gudgeons adapted to be inserted into the ends of said wrist pin and engage the ends of said tension spring, whereby said sleeve members co-operatively engaging with said head are adapted for radial adjustment thereto.

Signed at Toronto, this fifth day of March, 1930.

REGINALD TAYLOR.
HENRY TAYLOR.